(12) United States Patent
Schiff et al.

(10) Patent No.: US 7,933,215 B2
(45) Date of Patent: Apr. 26, 2011

(54) SYNCHRONIZATION ON REVERSE LINK OF MOBILE MODE COMMUNICATIONS SYSTEMS

(75) Inventors: Leonard N. Schiff, San Diego, CA (US); Ahmad Jalali, Rancho Santa Fe, CA (US); Wei Shi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1048 days.

(21) Appl. No.: 10/860,883

(22) Filed: Jun. 3, 2004

(65) Prior Publication Data

US 2005/0270999 A1    Dec. 8, 2005

(51) Int. Cl.
*H04L 12/26* (2006.01)

(52) U.S. Cl. .......................... 370/252; 370/254; 370/320

(58) Field of Classification Search ................ 370/208, 370/209, 320, 229, 230, 235, 254
See application file for complete search history.

(56) References Cited

U.S. PATENT DOCUMENTS

| | | | | | |
|---|---|---|---|---|---|
| 5,703,595 | A | * | 12/1997 | Tayloe et al. ................. | 342/175 |
| 5,943,606 | A | * | 8/1999 | Kremm et al. ................ | 455/12.1 |
| 5,956,619 | A | * | 9/1999 | Gallagher et al. ............ | 455/12.1 |
| 7,082,292 | B2 | * | 7/2006 | Underbrink ................... | 455/255 |
| 2004/0221218 | A1 | * | 11/2004 | Grob et al. .................... | 714/748 |
| 2005/0270999 | A1 | * | 12/2005 | Schiff et al. .................. | 370/318 |

FOREIGN PATENT DOCUMENTS

| | | |
|---|---|---|
| EP | 0806845 | 11/1997 |
| JP | 08-094733 | 4/1996 |
| JP | 10-142312 | 5/1998 |
| JP | 2000-040958 | 2/2000 |
| WO | 2004002022 | 12/2003 |

OTHER PUBLICATIONS

OA dated Jun. 19, 2009 for CN Application Serial No. 200580025990.3, 12 pages.
OA dated Mar. 21, 2008 for KR Application Serial No. 2007-7000173, 4 pages.
OA dated Sep. 10, 2008 for KR Application Serial No. 2007-7000173, 3 pages.
Japanese Office Action mailed Jan. 12, 2010 for Japanese Patent Application Serial No. 2007-515418, 3 pages.
International Search Report dated Oct. 3, 2005 for PCT Application Serial No. PCT/US2005/018833, 9 pages.
EP OA dated Mar. 7, 2007 for EP Patent Application Serial No. 05754907.3, 2 pages.
EP OA dated May 12, 2010 for EP Patent Application Serial No. 05754907.3, 3pages.
Canadian Office Action dated Aug. 23, 2010 for Canadian Patent Application Serial No. 2568605, 6 pages.

* cited by examiner

*Primary Examiner* — Seema S Rao
*Assistant Examiner* — Mon Cheri S Davenport
(74) *Attorney, Agent, or Firm* — Turocy & Watson, LLP

(57) ABSTRACT

Methods and apparatus are disclosed to provide orthogonal multiple access communication in a return link of a satellite communication system. In one embodiment, a closed loop control of a transmit parameter associated with transmission of signals may be performed. In addition, changes in motion of a terminal are monitored such that an open loop control of the transmit parameter is performed, if the detected change meets a certain threshold. For example, an open control is performed if an abrupt or sudden motion is detected.

29 Claims, 6 Drawing Sheets

MACHINE
READABLE
MEDIUM
620

MACHINE
EXECUTABLE
INSTRUCTIONS
610

Figure 6

SYNCHRONIZATION ON REVERSE LINK OF MOBILE MODE COMMUNICATIONS SYSTEMS

BACKGROUND

I. Field of Invention

The invention generally relates to wireless communication systems, and more particularly to satellite and aerial communication system that utilize orthogonal multiple access techniques.

II. Description of the Related Art

Various communication systems, including satellite and aerial, have been developed over the years. Orthogonal Code Division Multiple Access (OCDMA) is one technique that can be used in satellite communication systems. Code Division Multiple Access (CDMA) is characterized by the use of spread spectrum modulation technique that provides separate user or user traffic signal channels. In typical CDMA based satellite systems, signals from different terminals are not synchronized. As a result, the signals can arrive out of code phase and cause interference with each other.

In OCDMA based satellite systems, the signals transmitted from different terminals are timed such that they arrive synchronously, and are in code phase with each other or have code synchronization, at the receiver. Particularly, each user terminal is assigned orthogonal Walsh codes that are used to distinguish different terminal transmissions. With synchronization in frequency and in time, there is generally no or very little cross-interference among the different signals received from terminals since the cross-correlation approaches zero. This achieves higher bandwidth efficiency due to the significantly reduced interference.

Orthogonal multiple access may also be achieved using other modulation schemes such as Orthogonal Frequency Division Multiple Access (OFDMA). In OFDMA the available bandwidth is divided into a number of frequency bands referred to as tones. These tones are orthogonal to each other in the sense that after matched filtering at the receiver, no interference is observed from other tones. Different users are assigned a subset of the available tones. A guard time, where the cycle prefix of OFDMA symbol is inserted, helps maintain orthogonality among different tones as long as it is larger than the largest differential delay among users. In systems with large differential delays among terminals such as Geostationary satellites or communication from airplanes to a ground station the guard time needs to be excessively large resulting in efficient use of bandwidth. Therefore, even in OFDMA one would require a certain degree of timing synchronization among different terminals in order to reduce the length of the cyclic prefix. Frequency synchronization among different users received signal is needed in OFDMA as well as OCDMA.

On the forward link of a satellite communication system, orthogonality among different codes is effectively maintained because the signals originate at the same location, namely at the hub or gateway that provides communication service to one or more remote terminals. Where several gateways are used throughout a communication system, they are generally configured to use a common timing source, such as the phase of signals detected from Global Positioning System (GPS) satellites, which employ a form of what is referred to as Universal Time. Alternatively, gateways can be in communication with each other and/or a timing signal reference may be used to provide a synchronization mechanism.

OCDMA/OFDMA techniques may also be used in the return or reverse link paths of a satellite and aerial communication systems, that is, for signals transferred from terminals to a hub or gateway or from airplanes to a ground station. The use of OCDMA in the return signal is disclosed in co-pending U.S. patent application Ser. No. 10/603,421, filed on Jun. 23, 2003 under the title "Orthogonal Code Division Multiple Access on Return Link." Generally, for signals being transferred by terminals on the return link, there is no common synchronization mechanism. Accordingly, signals transmitted from different terminals may arrive asynchronously at the gateway(s) due to their different propagation delays. Therefore, while satellite communication systems can easily incorporate OCDMA or and OFDMA for use on forward links, it is more difficult to use this technique on the reverse links. Moreover, mobility creates additional problems in synchronizing the time bases and frequencies of the transmit signals in the reverse link paths.

Therefore, there is need for a more efficient and/or effective orthogonal multiple access, such as for example OCDMA or OFDMA, in the return signal paths of a satellite communication systems.

SUMMARY

As described above, parameters such as the time and frequency of the received signals from different user terminals should be closely synchronized in order to maintain orthogonality among the signals on the reverse link. Embodiments disclosed herein address the above stated needs by providing methods and apparatus for achieving time and frequency synchronization.

In one aspect, a method for providing orthogonal multiple access communication in a return link of a communication system comprises performing a closed loop control of at least one transmit parameter associated with transmission of signals; monitoring to detect changes in motion of a terminal; and performing an open loop control of at least one transmit parameter, if the detected change meets a certain threshold. The closed loop control may comprise receiving a control signal comprising information used for adjusting a transmit parameter; and adjusting the transmit parameter in response to the control signal. Also, the closed loop control may further comprise sending a reverse link pilot signal for use in generating the control signal. The open loop control may comprise adjusting the transmit parameter based on the detected change. The change may be detected by tracking Doppler frequency at the terminal. Position location information received from a Global Positioning System may be used to track the Doppler frequency.

In another aspect, an apparatus for use in a terminal for providing orthogonal multiple access communication in a return link of a communication system comprises a processor configured to perform a closed loop control of at least one transmit parameter associated with transmission of signals; a motion detecting unit coupled to the processor, configured to monitor to detect changes in motion of a terminal; and wherein the processor is configured to perform an open loop control of at least one transmit parameter, if the detected change meets a certain threshold. The motion detecting unit may comprise a Global Position System receiver configured to generate position location information in monitoring to detect changes in motion of the terminal.

In still another aspect, an apparatus for providing orthogonal multiple access communication in a return link of a communication system comprises means for performing a closed loop control of at least one transmit parameter associated with transmission of signals; means for monitoring to detect changes in motion of a terminal; and means for performing an open loop control of at least one transmit parameter, if the detected change meets a certain threshold.

In a further aspect, a machine readable storage medium for use in providing orthogonal multiple access communication in a return link of a communication system comprises instructions for performing a closed loop control of at least one transmit parameter associated with transmission of signals; instructions for monitoring to detect changes in motion of a terminal; and instructions for performing an open loop control of at least one transmit parameter, if the detected change meets a certain threshold.

In still a further aspect, a method for providing orthogonal multiple access communication in a return link of a communication system comprises receiving a forward link pilot signal; deriving a transmit parameter from the forward link pilot signal; sending a reverse link pilot signal based on the derived transmit parameter; monitoring to detect changes in motion of a terminal; and adjusting the transmit parameter based on the detected change, if the detected change meets the certain threshold.

In the above embodiments, the transmit parameter may be frequency. The transmit parameter may also be timing. Additionally, the orthogonal multiple access may be OCDMA based technique or OFDMA based technique. Moreover, the communication system may be a satellite or an aerial communication system.

BRIEF DESCRIPTION OF THE DRAWINGS

Various embodiments will be described in detail with reference to the following drawings in which like reference numerals refer to like elements, wherein:

FIG. 6 shows machine readable storage medium.

DETAILED DESCRIPTION

Figure 1:
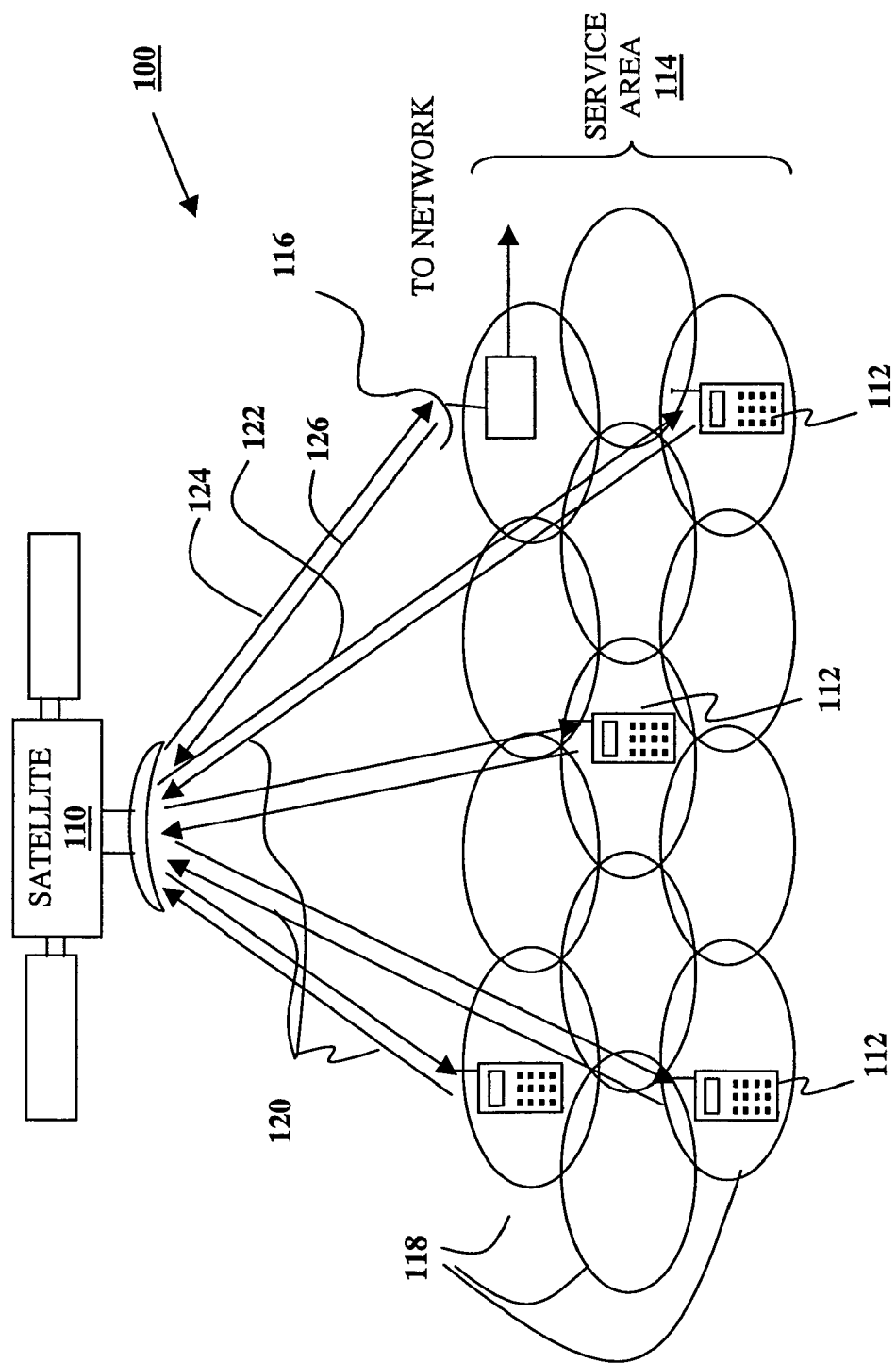
FIG. 1 shows an example embodiment of a satellite-based communication system.

Embodiments described below allow a more efficient and/or accurate code synchronization in the return link of an OCDMA based satellite communication systems. In OCDMA based systems, signals from terminals maintain orthogonality from each other by arriving at the gateway with relatively the same frequency with nearly perfectly aligned chip patterns. However, there are factors that interfere with achieving this synchronization. Satellite motion oscillation about its orbital position causes frequency and timing offsets. Different terminals being located at different points in the satellite footprint may also cause Doppler frequency differences among the terminals. In addition, motion of one or more terminals may cause frequency and timing offsets. It should be noted here that the embodiments are described with reference to OCDMA for purposes of explanation. However, the synchronization techniques may apply to other orthogonal multiple access modulation schemes, such as but not limited to OFDMA. Similarly, while the embodiments are described with reference to a satellite communication system, the synchronization techniques may apply to other communication system, such as but is not limited to aerial communication system.

To achieve synchronization, the terminals in accordance with the embodiment perform closed loop control as well as open loop control of transmit operation parameters, such as the frequency and timing (hereinafter "transmit parameters"). Generally, a terminal in accordance with the embodiments may receive, from a gateway, a control signal including information that can be used to adjust one or more transmit parameters. The control signal is based on reference signals from the terminal to the gateway. The terminal may then adjust one or more transmit parameters in response to the control signal. Therefore, a closed loop control of the transmit parameter(s) is performed at a terminal. In addition, the terminal also monitors to detect changes in its motion. If the detected change meets a certain threshold, the terminal may perform the adjustment of one or more transmit parameters based on the detection of its motion. Accordingly, the terminal performs open loop control.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, as disclosed herein, the term "hub," and "gateway" may be used interchangeably in the art and refer to specialized ground stations or base stations that direct communications through satellites. The terms "terminal" and "user terminal" may be used interchangeably, and refers to subscriber units, mobile units, mobile stations, or other wireless communication devices such as, but not limited to, a cellular telephone, a data transceiver, a personal data assistant, and a pager. The terminal may be hand-held, vehicle-mounted as desired, or an airborne device. The term "storage medium" may represent one or more devices for storing data, including read only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

FIG. 1 shows an example embodiment of a satellite-based communication system 100 incorporating a satellite 100 that relays communications between a plurality of terminals 112 in a service area 114 and at least one gateway 116. It should be noted that there may be more than one satellite in system 100 and/or more than one gateway in service area 114. Gateway 116 may provide, for instance, an access point between the satellite network and external networks, such as the Internet or some other external network (not shown). Terminals 112 communicate with the external network through satellite 110 and gateway 116.

Service area 114 is covered by one or more beams 118, also referred to as cells, which are projected onto the surface of the earth by satellite 110. Beams 118 illuminate a "spot" or area produced by projecting satellite communications signals onto the earth's surface. The beams are arranged in a predetermined coverage pattern. Each beam 118 typically uses either the full frequency spectrum available to satellite 110 in the case of a full frequency reuse pattern, or some division of the available frequency spectrum in the case of a partial reuse pattern. Each beam 118 may also include a number of sub-beams, also referred to as channels or links, covering a common geographic area, with each sub-beam occupying a particular frequency band.

There are four types of communication links. A forward/uplink 126 which includes signals transmitted from gateway 116 to satellite 110. A return/downlink 124 which includes signals transmitted from satellite 110 to gateway 116. A forward/downlink 122 which includes signals transmitted from satellite 110 to terminals 112 in beam 118. A return/uplink 120 which includes signals transmitted from terminals 112 to satellite 110. Accordingly, forward/uplink 126 and return/uplink 120 together comprise the uplink, which includes signals going to satellite 110. Forward/downlink 124 and return/downlink 122 together comprise the downlink, which includes signals being transmitted from the satellite. Similarly, forward/uplink 126 and forward/downlink 122 together comprise the forward link, which includes signals going from gateway 116 to terminals 112. Return/uplink 120 and return/downlink 124 together comprise the return link, which includes the signals going from terminals 112 to gateway 116.

Orthogonal CDMA is used in the return direction of a satellite based communications system by using orthogonal codes as part of the signal modulation and demodulation. In OCDMA, each user terminal is assigned a Walsh code on the reverse link. The length of the Walsh code determines the data rate at which the user terminal may transmit data. OCDMA based systems employs a known code-phase relationship between signals from at least two terminals in a beam. The known code-phase relationship between signals for the various terminals is such that the timing or phase of the respective Walsh codes are separated relative from one another by only a small fraction of a chip period or duration, and carrier frequency differences that are generally within a few degrees of one another are maintained.

Therefore, the return link signals of an orthogonal CDMA based communication systems are synchronized to maintain the orthogonality. In satellite communication systems, such as the system shown in FIG. 1, satellite 110 may not be in a fixed position, but is in motion relative to service area 114. As satellite 110 moves, the distance between the satellite and terminals 112 changes. In addition to the movement of satellite 110, one or more of terminals 112 may also be in motion, hereinafter referred to as a mobile terminal. For example, the terminal may be a dive on an airplane.

Moreover, as discussed above, OFDMA may also be used as the orthogonal multiple access modulation scheme. In OFDMA, a certain number of tones are assigned to each terminal. The number of tones determines the data rate that the terminal may transmit. However, as mentioned earlier OFDMA systems also require frequency synchronization. Although timing synchronization for OFDMA systems is not as critical it is needed to reduce the cyclic prefix requirement. The synchronization schemes described hereinafter apply equally to OFDMA systems. The main difference is the structure of physical layer channels such as the pilot signals. However, the synchronization mechanisms described below are agnostic to the actual structure of the physical pilot and other feedback channels as long as the required measurements are made with adequate quality.

To maintain synchronization of transmit parameters such as frequency offset and code timing, gateway 116 may monitor or track the movement of satellite 110 and terminals 112, and sends a control signal that includes information that can be used to adjust the transmit parameters. Terminals 112 receives the control signal and may adjust the transmit parameters in response to the control signal. In one embodiment, terminals 112 sends, to gateway 116, a reference signal that includes information that can be used to generate the control signal. For example, based on the motion of satellite 110 and mobile terminal(s), the control signal may include instructions that results in additional adjustment to the transmit parameter in order to compensate for the motion of mobile terminal(s). As a result, a closed loop control of the transmit parameter is performed. Accordingly, the return link signals from each terminal 112 may be time synchronized such that the Walsh codes are separated by a certain chip period and certain carrier frequency differences are maintained.

However, if a mobile terminal makes an abrupt change in motion, such as a quick turn or change in direction, or a sudden acceleration/deceleration of speed, gateway 116 may not be able to adequately monitor the relative movements of satellite 110 and the mobile terminal. Therefore, in the embodiments described below, terminals 112 may monitor to detect changes in their own motion. If the detected change in the motion meets a certain threshold, terminal 112 may adjust its transmit parameter based on the results of the detection. Alternatively, terminal 112 may discontinue, temporarily, to adjust its transmit parameter in response to the control signal from gateway 116. As a result, an open loop control of the transmit parameter is performed.

In one embodiment, a pilot signal is used as a coherent phase reference for forward link signals. That is, a signal which contains no data modulation is transmitted by gateway 116 throughout a region of coverage as a reference. Pilot signals are used by terminals 112 to obtain initial system synchronization and provide time, frequency, and phase tracking of other signals transmitted by gateway 116. Phase information obtained from tracking a pilot signal carrier is used as a carrier phase reference for coherent demodulation of other system signals or traffic (i.e., data) signals. This technique allows many traffic signals to share a common pilot signal as a phase reference, providing for a less costly and more efficient tracking mechanism. A single pilot signal is typically transmitted by each gateway or base station for each frequency used and shared by terminals receiving signals from that gateway or base station on that frequency. A more detailed explanation will be described below with reference to FIG. 1. For purposes of explanation, geo-stationary satellites based communication systems will be assumed. However, the scope of the embodiments may be extended to other communication systems.

In geo-stationary based systems, gateway 116 transmits a pilot signal in the forward link direction, hereinafter referred to as either forward link pilot signal or first pilot signal. One or more terminals 112 located in the forward link beam acquire and track the transmitted pilot signal. Each terminal 112 operates to recover carrier phase and modulation chip clock timing from the pilot signal that originated at gateway 116. Each terminal 112 then derives its transmit or transmission carrier frequency and chip clock timing from the recovered forward pilot carrier frequency and modulation chip clock timing.

At an appropriate time in accordance with the applicable protocol or system in use (which is well understood in the art), each terminal 112 in communication with gateway 116 transmits a pilot signal in the reverse link direction, hereinafter referred to as either reverse link pilot signal or second pilot signal. It should be noted that some or all terminals 112 may be implemented with the ability to advance or retard the timing of transmissions or transmitted signals relative to the timing previously derived from the forward link pilot signal.

As described above, terminals 112 track parameters for gateway 116 using the first pilot, and subsequently the gateway tracks parameters for terminals 112 using the second pilot. By tracking the parameters, one or more transmit parameters may be monitored for the code phase synchronization. More particularly, parameter such as signal timing may be tracked and/or the frequency of either the first or the second pilot signal(s) may also be tracked. Typically, the offset value between the tracked frequency and a reference frequency is one transmit parameter.

Accordingly, terminals 112 may derive at least one transmit parameter from the received first pilot signal. This derivation is performed within each of the plurality of terminals 112. Terminals 112 then transmit, at an assigned time, second pilot signals containing the derived at least one transmit parameter. For example, assuming the transmit parameter is the code timing or period, gateway 116 would compare the timing of the second pilot signals to a reverse link reference signal. A return link reference signal, typically generated at gateway 116, represents the ideal timing of a perfectly timed return link transmission as it should be received at gateway 116. The reference signal can be derived from a local reference, delayed by the predicted round trip delay to and from a reference point on the earth (typically the center of the beam) through a satellite transponder, plus a suitable margin to allow for more distant terminals 112. Alternatively, the reference signal can be derived from the received pilot signals of one or more terminals 112.

Based, at least in part, upon this comparison of the reference and reverse link pilot signal(s), gateway 116 determines the timing or control information which is to be transmitted to each terminal. The control information represents data that indicates the timing discrepancy between the reverse link pilot signals and the reference signal. This information is to be used by a terminal to alter or adjust the timing of the signals transmitted to the gateway by advancing or retarding the signal timing relative to the reference signal such that a desired timing for synchronization is achieved.

The gateway then transmits a control, command, or a reference signal on the forward link to each desired terminal, which acts to instruct the terminal to advance or to retard its transmit parameters. This can be referred to as control signaling. In response to the information or commands provided by the gateway, each terminal adjusts its transmit timing and/or frequency, typically, in small increments, in accordance with the instructions received, to maintain time alignment with the receiver(s) in the gateway.

For example, the timing can be advanced or retarded using several pre-selected approaches or techniques to determine the amount or magnitude by which an adjustment is made. In one embodiment, during system design, a predetermined amount of adjustment or change in timing or frequency may be selected and used as the basis for responding to control signals. Such values can be based on known empirical data as to how quickly or effectively a terminal adjusts parameters, and how large a change is generally required to achieve a given result. It can also be based on design characteristics of the terminal. In addition, there may be delay factors in executing the instructions which might lead one to want to make smaller changes within the terminal to avoid overshooting a desired value. Such a process of determining and implementing the changes in a terminal's transmit timing, which are used to maintain the time alignment, may be performed for a plurality of terminals in a beam. Ensuring the desired time alignment is one aspect of the present invention which enables the use of orthogonal CDMA in the return direction.

Therefore, a gateway transmits a forward link pilot signal. A terminal acquires and tracks the forward link pilot signal, recovering the carrier phase and modulation chip clock timing. A terminal then derives its transmit carrier frequency and chip clock timing from the recovered forward pilot carrier frequency and chip clock timing.

While the above process may provide an adequate synchronization for most terminals 112, the transmit carrier frequency and/or chip clock timing, derived based on the forward link pilot signal, may cause errors in synchronization and thereby interference when a terminal is mobile. As described above, an abrupt change in the direction or speed in the movement of a terminal may cause the terminal to transmit signals that are not orthogonal to other signals. Therefore, each terminal 112 monitors to detect its movement such that when a sudden movement is detected, terminal 112 makes an open loop adjustment to the transmit parameters.

Figure 2:
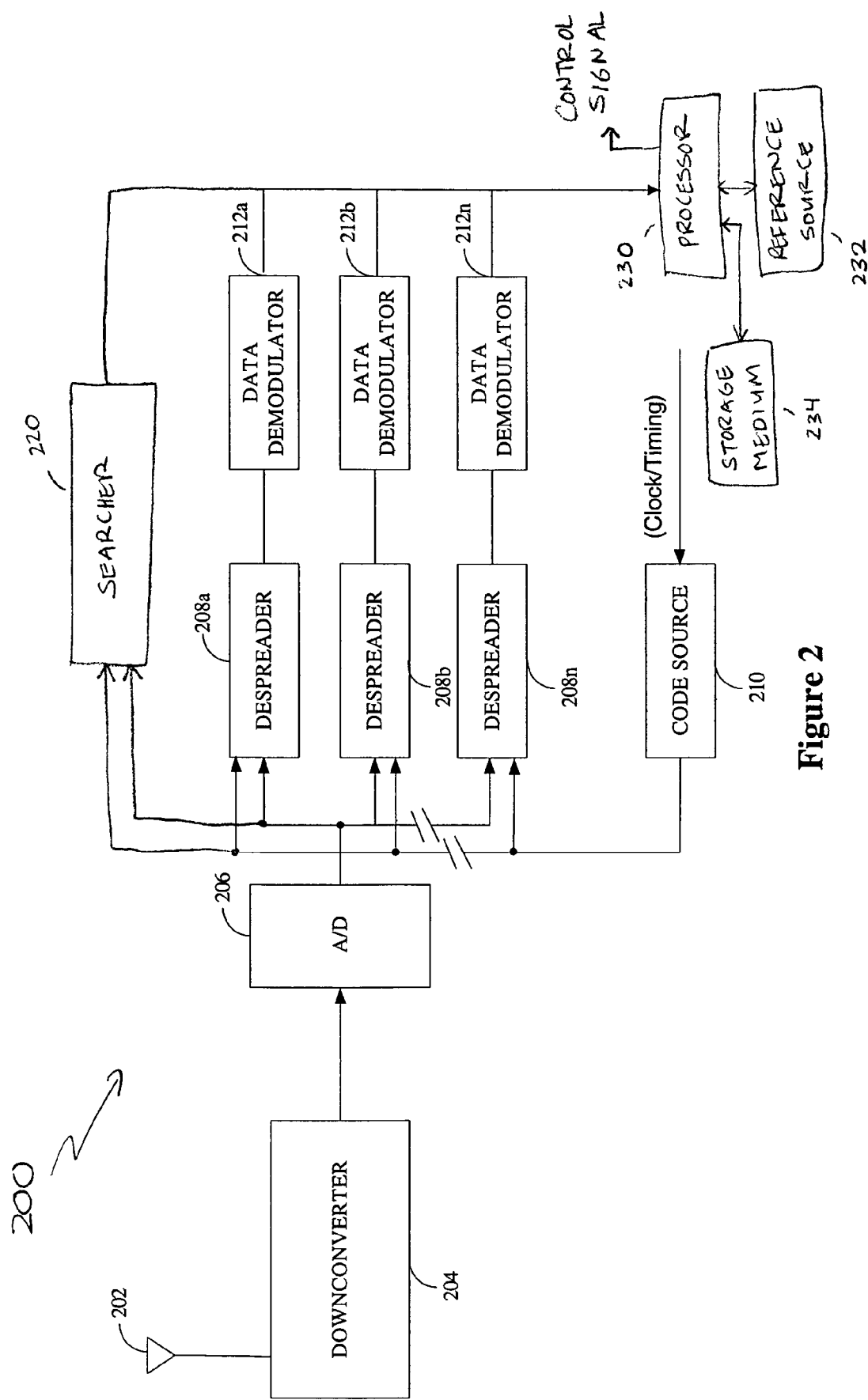
FIG. 2 shows an example embodiment of a receiver that may be implemented in a gateway of an OCDMA based communication system.

FIG. 2 shows an example embodiment of a receiver 200 that may be implemented in a gateway for receiving a plurality of concurrent orthogonal CDMA transmissions on the return link from a plurality of terminals. Receiver 200 includes an antenna 202 coupled to a downconverter 204 that takes an RF signal and reduces the frequency, based on various techniques for downconversion. The downconverted signal is converted from analog to digital signal by an analog-to-digital (A/D) converter 206.

The digital signal is input into each of a plurality of despreaders 208a~208n. A code source 210 is also coupled to each of despreaders 208a~208n. Code source 210 provides the despreaders with the code needed to despread the incoming CDMA signals. Each despreader 208a~208n is also coupled respectively to data demodulators 212a~212n.

In order to generate the desired commands or control signals discussed above, receiver 200 uses despreaders 208a~208n and demodulators 212a~212n. In some embodiments, a searcher 220 may be implemented and control signals may be generated using despreaders 208a~208n and searcher 220. Searcher 220 detects for the various, non-data bearing, pilot signals received from the terminals. Information from searcher 220 or the demodulators is received by a receiver controller or processor 230. Processor 230 uses the information to determine certain transmit parameters from, or associated with, the pilot signals from terminals, such as either timing or frequency offsets. This is generally accomplished by detecting and comparing the timing or frequency with that of a reference signal. The reference signal may be provided by a reference source 232 as shown. In alternative embodiments, the reference signal may be stored in and provided by a storage medium 234.

In addition, processor 230 can use storage medium 234 to store information about what types of commands are desirable to issue depending on the results of the comparison. For example, if the comparison shows the timing is too fast or frequency is too high, the processor can simply send a command or request to retard either parameter in the terminal. If, on the other hand, the frequency is too low or the timing is too slow, processor 230 can send a simple command requesting the terminal to advance the value. However, processor 230 can also send more complicated instructions, as desired, in some systems in which it specifies the amount of the offsets to be compensated for and a request for adjustment, or a specific value by which an adjustment should be made. Such commands can be sent as separate signals or appended to other communications, such as traffic, access instructions, or command and control signals being forwarded to the terminals.

Figure 3:
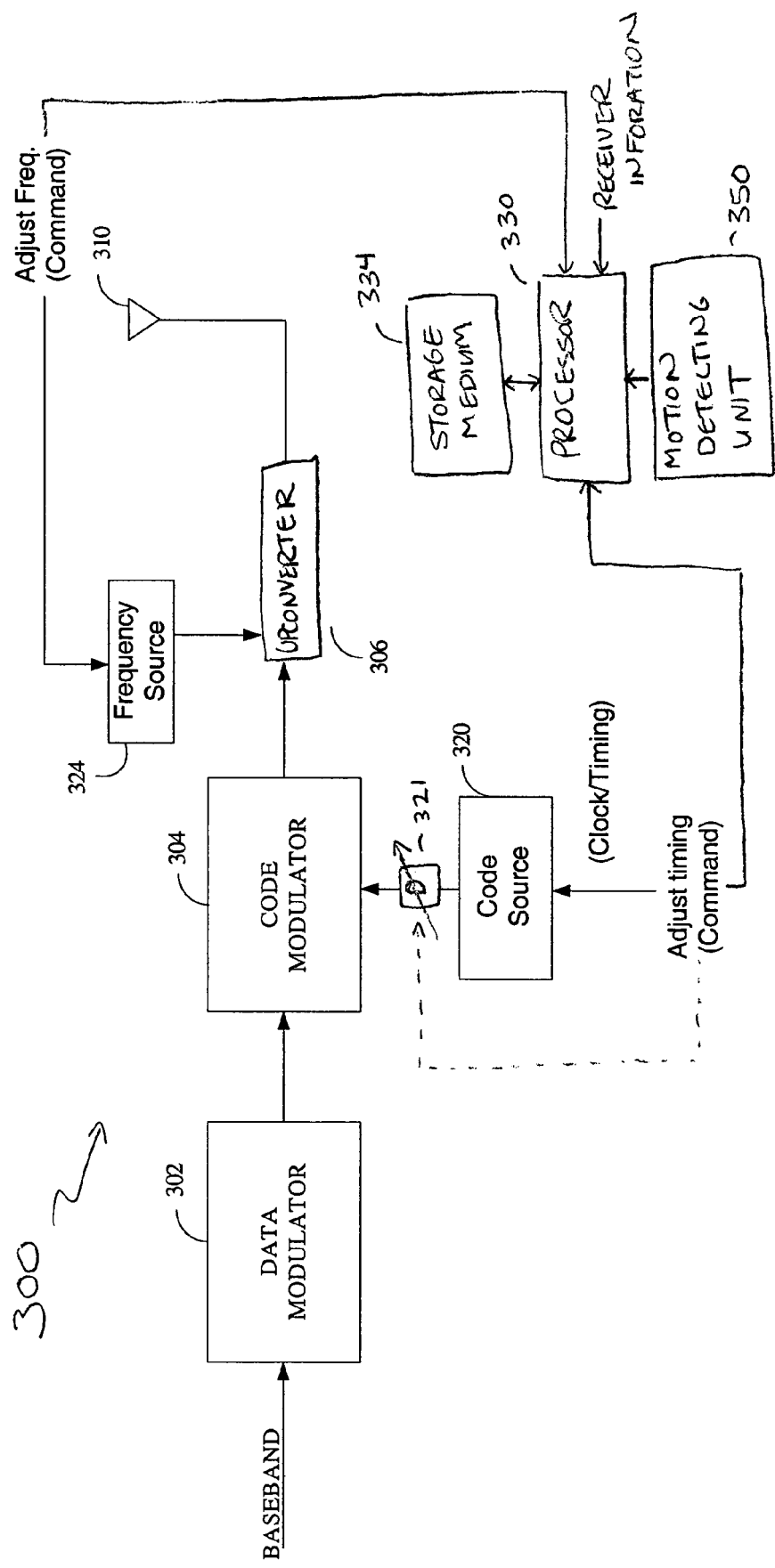
FIG. 3 shows an example embodiment of a transmitter that may be implemented in a terminal for transmitting signals in the return link using OCDMA.

FIG. 3 shows an example embodiment of a transmitter 300 that may be implemented in a terminal for transmitting signals in the return link using OCDMA. Transmitter 300 is adapted not only to transmit CDMA signals but also to adjust their transmit parameter(s). Transmitter 300 includes a data modulator 302 that modulates baseband signals and a code modulator 304 that further modulates, in accordance with the assigned code channel, the signal to be transmitted. The signal to be transmitted is up-converted by an up-converter 306, and transmitted through antenna 310. Any suitable means of up-conversion may be used.

A processor 330 uses command or control information received by a receiver portion (not shown), which is well known in the art, to determine what commands or requests for adjustment have been forwarded to the terminal. Processor 330 determines the appropriate action to take and may adjust transmit parameters associated with the transmission of signals from the terminal. For example, processor 330 determines if either timing or frequency offsets are being compensated for and by what amount. The commands may specify an amount of adjustment or instruct that a predetermined adjustment take place to either retard or to advance the parameter values. In addition, processor 330 can use storage medium 334 to store information about what types of actions are desirable to implement depending on the adjustment information or commands being received. For example, where fixed adjustment commands are sent, processor 330 can use previously stored information to select the amount by which a parameter is changed. Storage medium 334 may indicate different amounts that can change with time, or other activities within the terminal, and so forth.

However, because abrupt motion can cause errors in synchronization, transmitter 300 further comprises a motion detecting unit 350. Motion detecting unit 350 detects the motion of the terminal. In one embodiment, motion detecting unit 350 monitors or tracks the Doppler using any known techniques to determine the slew rate. If the Doppler is too high or changes suddenly, processor 330 makes open loop adjustments to the transmit timing and frequency. Processor 330 adjusts the transmit parameter based on the detected Doppler rate, namely the slew rate that can be derived from the Doppler rate.

If an adjustment request is based on the timing being too fast or frequency too high, processor 330 commands either a code source 320 to retard the code timing, or a frequency source 324 to retard or decrease the frequency, respectively. If, on the other hand, the adjustment request is based on the timing being too slow, or the frequency being too low, processor 330 commands either code source 320 to advance the code timing, or frequency source 324 to advance or increase the frequency, respectively. Alternatively, processor 330 can use a delay element 321 to adjust the code timing, separate from the code source, as desired.

Moreover, it should be noted that transmitter 300 is a simplified embodiment. A more typical commercial transmitter may have additional components such as a power control unit that determines the transmit power level for the signal to be transmitted. Transmitter 300 may also have additional frequency sources and/or delay elements to allow adjustment of code timing and/or frequency. It is also to be understood that typical terminals are known to have one or more controllers for detecting certain characteristics of the signals being received or transmitted, to affect timing changes for output signals, to assist with the timing and control of modulation, code selection, and other processes within the terminal. Processor 330 can form part of such controllers or be configured as a separate processor which is dedicated to the operations of embodiments of the invention. It is also noted that the retarding and advancement of code timing is discussed and illustrated in the patents referred to above as well as in U.S. Pat. No. 6,327,534B1 issued Dec. 4, 2001.

In one embodiment, the closed loop frequency adjustment comprises gateway 116 measuring the received frequency from terminals 112 on the reverse link and comparing the measured frequency against a target or reference frequency. The objective is for the carrier frequency received from terminals 112 to be sufficiently close to one another such that the loss of C/I is minimized. Let ft be the reference frequency and let fc be the estimated receive frequency from a given terminal 112. Gateway 116 computes the difference between the measured carrier frequency received from a given terminal and the reference frequency, $\Delta f = f_r - f_e$, and transmits this difference to each terminal 112. Terminals 112 adjust its transmit carrier frequency by $-a\Delta f$, $0 < a < 2$.

In steady state, when terminals 112 have been either stationary or traveling at a relatively constant speed in a certain direction, the above procedure will ensure convergence of the terminal's received carrier frequency to the desired frequency. The above procedure may result in adjustment of transmit frequencies to compensate for the new Doppler frequency. However, if the terminal's speed or direction movement changes abruptly as described above, the Doppler frequency in the received carrier frequency from terminal 112 at the gateway will change. This change in received frequency will result in a difference among the frequencies received from the different terminals 112, which in turn results in loss of orthogonality among the different signals on the reverse link.

The above procedure may result in adjustment of transmit frequencies to compensate for the new Doppler frequency. However, in situations where the terminal may change motion at a constant rate up to a certain threshold, the delay in communicating the changing Doppler frequency to terminals 112 will result in a significant enough amount of frequency offset at gateway 116 until the movement of terminal 112 settles. During this time period, the reverse link performance may be poor.

Therefore, an open loop frequency adjustment may be performed in response to Doppler induced by the terminal's as well as the satellite's movement. The changes in the Doppler induced by abrupt changes of a terminal are estimated by the frequency tracking algorithms in terminal 112 as described above, and a corresponding correction is made to the transmit frequency of terminal 112. Note that any change in the speed/direction of terminal 112 changes the Doppler frequency on the forward link, which is measured by the terminal's frequency tracking loops. The measured change in this Doppler frequency on the forward link is used to estimate the change in the Doppler frequency on the reverse link.

The movement of terminal 112 will impact the Doppler frequency on the link between the terminal and satellite 110. Accordingly, the component of Doppler frequency on the uplink of the forward link and the Doppler frequency in the downlink portion of the reverse link will be changed. Therefore, the Doppler frequency induced on the reverse link by the terminal's movement is the change in Doppler measured on the forward link times the ratio of the downlink frequency of reverse link to the uplink frequency of the forward link. Let $\Delta f_{FL}$ (n) be the change in the receive frequency as measured by the terminal's frequency tracking loop over the measurement period n. The reverse link transmit frequency at the terminal is changed by $$\frac{f_c^{FL}}{f_c^{RL}}\Delta f_{FL}(n) + \Delta f_{FL}(n) \qquad \text{Equation 1}$$

where $f_c^{FL}$ and $f_c^{RL}$ are the forward link and return link carrier frequencies. Note that the second term in equation 1 is due to the fact that the transmit frequency of the terminal is derived from the receive frequency of the terminal. Therefore, the Doppler induced on the forward link will add to the Doppler induced on the return link. The terminal makes an open loop correction to the transmit frequency according to the estimate of equation 1. Any residual frequency offset measured at the gateway on the reverse link will be reported to terminal 112, which is used to adjust the terminal's transmit frequency. Note that in some alternative embodiments, the terminal may implement and use a Global Positioning System (GPS) receiver to estimate the change in Doppler frequency based on the change in position and velocity update received from the GPS receiver. In one embodiment, the GPS receiver may be implemented in motion detecting unit 350. Accordingly, position location information from the GPS receiver may be used to estimate the change in Doppler frequency.

Timing synchronization as described above is also needed to ensure that the reverse link signals from different terminals 112 are received at gateway 116 synchronously. In one embodiment, the closed loop timing adjustment procedure works as follows. Gateway 116 continuously compares the timing of the signal received from a given terminal 112 to a reference time. When the terminal's receive timing deviates from the reference time by more than a certain amount, Gateway 116 sends a message to terminal 112 commanding it to adjust its transmit timing accordingly.

Let $T_t$ be the desired target or reference timing and let Te be the estimated timing from a given terminal 112 at gateway 116. Gateway 116 computes the difference between the measured timing and the reference timing, $\Delta T = T_t - T_e$, and transmits this difference to each terminal 112. Terminal 112 adjusts its transmit timing clock by $-a\Delta T$, $0 < a < 2$.

As in closed loop frequency adjustment, the receive timing may deviate at a constant rate due to the motion of the mobile with respect to the satellite. . The rate of change of the receive timing, referred to as the clock slew rate, at gateway 116 is estimated. The estimated slew rate is then transmitted to terminal 112. Let the estimated slew rate at gateway 116 during the nth measurement period be expressed as follows, $$S_e(n) = \frac{\Delta T(n)}{T_m} \qquad \text{Equation 2}$$

where $\Delta T(n) = T_t - T_e(n)$ is the change in timing between the reference timing and the estimated timing from a given terminal at the end of the nth measurement period, and $T_m$ is the measurement time interval. Then, the slew rate of the terminal's transmit clock may be updated as follows $$S_t(n) = S_t(n-1) + aS_e(n), \qquad \text{Equation 3}$$

where $0 < a < 2$. Terminal 112 adjusts its transmit timing by $S_t(n)$, i.e. either retards or advances its transmit timing according to $S_t(n)$ However, there will be sudden changes to the slew rate if terminal 112 makes a sudden change in motion. If terminal 112 were to rely on gateway 116 to estimate the change in the slew rate and communicate it to terminal 116, there would be large errors in timing due to the delay in reporting the change in the slew rate to terminal 112.

Therefore, in the open loop timing adjustment, terminal 112 uses the change in the Doppler frequency on the forward link, to make an estimate of the change in the slew rate as follows.

$$\frac{\Delta f_{FL}(n)}{f_c^{FL}} \qquad \text{Equation 4}$$

Twice the slew rate estimated by equation 4 is added to the current transmit timing slew rate $S_t(n)$ that terminal 112 is using to adjusts its timing. Note also that as in the frequency adjustment, in some alternative embodiments, GPS may be used to estimate the timing slew rate. More particularly, position location information from a GPS receiver may be used to make estimate of changes in velocity of the mobile with respect to the satellite from which the timing slew rate may be estimated.

While a detailed algorithm for frequency synchronization and timing synchronization has been provided above, it would be apparent to those skilled in the art that other algorithms may be used for adjusting frequency and/or timing to achieve synchronization. Similarly, those skilled in the art will readily understand how to implement this process in a variety of ways.

Figure 4:
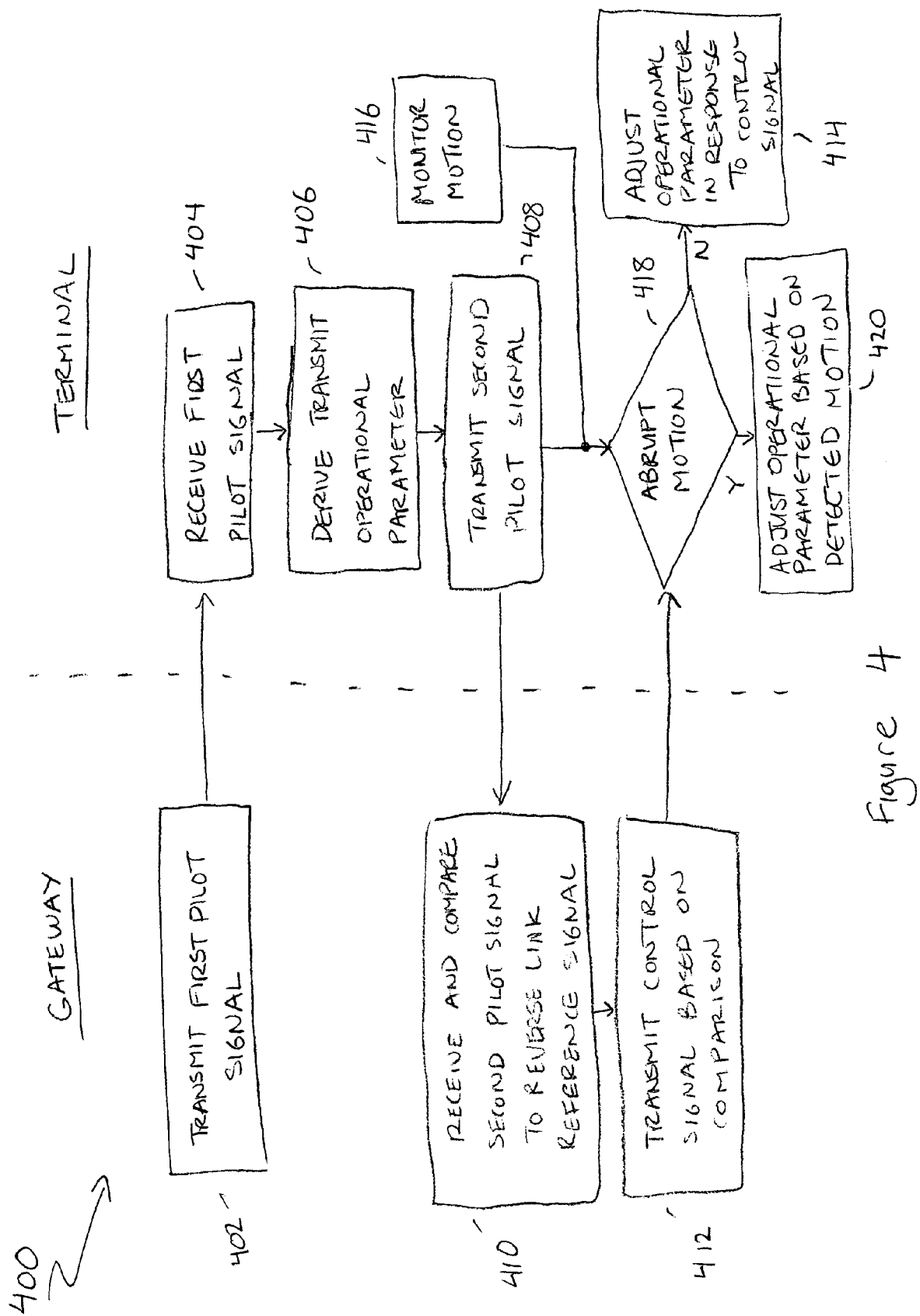
FIG. 4 shows an example embodiment of a method for using OCDMA in the reverse link of a communications system including a geo-synchronous satellite.

FIG. 4 shows an example embodiment of a method 400 using OCDMA in the reverse link in a communications system including a geo-synchronous satellite. In method 400, a first pilot signal is transmitted (402) from a gateway in the forward link direction. That is, a signal is sent from gateway 116 to satellite 110, which in this embodiment is in a geosynchronous orbit, and that signal is relayed to a portion of the Earth's surface. The first pilot signal is received (404) at a terminal 112, and terminal 112 recovers carrier phase and modulation chip clock timing from the first pilot signal.

Terminal 112 then derives (406) a transmit carrier frequency and chip clock timing from the recovered forward pilot carrier frequency and modulation chip clock timing. Terminal 112 transmits (408) a second pilot signal in the reverse link direction to the geosynchronous satellite 110 and the satellite relays the second pilot signal to gateway 116. The second pilot signal is compared (410) at gateway 116 to a reverse link reference signal. Gateway 116 then transmits (412), in the forward link direction (i.e., up to the satellite, and then from the satellite down to the terminal), a control signal, where the content of the control signal is based at least in part on the comparison between the second pilot signal and the reverse link reference signal. In response to the control signal, at least one transmit parameter related to transmissions from the terminal, is adjusted (414) within the terminal. Typically, such adjustments relate to advancing or retarding the timing of the terminal's transmitted signals relative to the timing derived from the forward link pilot signal.

Moreover, terminal 112 is also detecting or monitoring (416) its movement. Accordingly, if an abrupt motion is detected (418), terminal 112 may adjust (420) one or more of such transmit parameters based on the motion detected. Therefore, open loop control of transmit parameter(s) is achieved.

Figure 5:
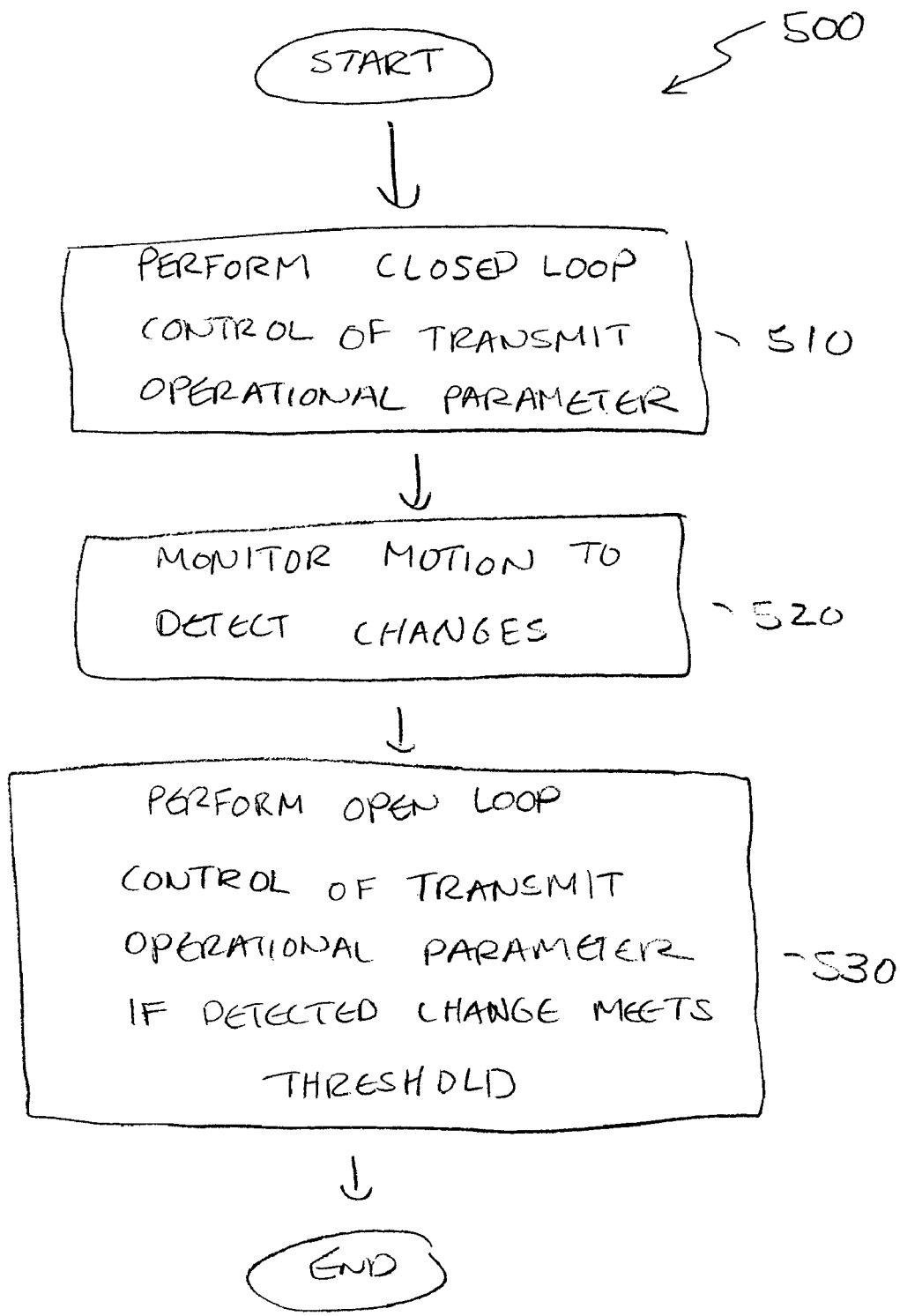
FIG. 5 shows an example embodiment of a method for adjusting operational parameter(s) at a terminal.

More particularly, FIG. 5 shows an example embodiment of a method 500 for adjusting transmit parameters at a terminal. Generally, a closed loop control of at least one transmit parameter is performed (510). The closed loop control may be performed by receiving a control signal, such as a forward link pilot signal, that contains control information. The control information as described above includes data from which a terminal may derive the appropriate adjustment. At least one transmit parameter may then be adjusted in response to the control signal.

However, the motion of the terminal is also monitored (520). The motion can be monitored, for example, by tracking the Doppler or Doppler rate. If a change that meets a certain threshold is detected, an open loop control of the at least one transmit parameter is performed (530). For example, the threshold may be a selected Doppler rate and if the detected Doppler rate is over the selected Doppler rate, open loop control would be performed. Here, an abrupt change in the motion of the terminal may result in the Doppler rate that is over the selected Doppler rate. If such condition is met, open loop control is performed by discontinuing the adjustment of at least one operational parameter in response to the control signal.

As described, by allowing terminals to monitor their motion, synchronization can be better maintained in the reverse link of an OCDMA based communication system. The use of OCDMA in the return link allows a plurality of terminals to transmit concurrently in a beam, with the same or lower aggregate power as would be used by, for example, time division multiple access (TDMA) technique. Moreover, it is again noted that the disclosed synchronization techniques is applicable to orthogonal multiple access modulation schemes other than OCDMA.

It should also be noted that embodiments may be implemented by hardware, software, firmware, middleware, microcode, or any combination thereof. When implemented in software, firmware, middleware or microcode, the program code or code segments to perform the necessary tasks may be stored in a machine readable medium such as storage medium 234 or 334 or in a separate storage(s) not shown. A processor such as processor 230 or 330 may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

For example, FIG. 6 shows software routines stored as machine executable instructions 610 in a machine readable storage medium 620, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc. From whatever source, the instructions may be accessed and executed by a processor. In alternative embodiments, discrete hardware or firmware may be used. For example, one or more application specific integrated circuits (ASICs) could be programmed with one or more of the above described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Furthermore, it should also be apparent to those skilled in the art that the elements of receiver 200 and/or transmitter 300 may be rearranged without affecting the operation of the receiver 200 and/or transmitter 300, respectively. Thus, the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for providing orthogonal multiple access communication in a return link of a satellite communication system, the method comprising:
   receiving a control signal at a terminal, the control signal comprising instructions to adjust at least one transmit parameter associated with transmission of signals;
   performing a closed loop control of the at least one transmit parameter by adjusting the at least one transmit parameter in accordance with the instructions received via the control signal;
   monitoring to detect changes in motion of the terminal; and
   performing an open loop control of the at least one transmit parameter in response to a change detected by the monitoring that meets a condition indicative of an abrupt change in motion, the open loop control comprising at least discontinuing the closed loop control of the at least one transmit parameter in accordance with the instructions received via the control signal.

2. The method of claim 1, wherein the receiving the control signal comprises receiving a forward link pilot signal.

3. The method of claim 2, wherein the performing the closed loop control further comprises:
   sending a reverse link pilot signal for use in generating the control signal.

4. The method of claim 1, wherein the performing the open loop control further comprises adjusting the at least one transmit parameter based on the change detected by the monitoring that meets the condition indicative of the abrupt change in motion.

5. The method of claim 1, wherein the adjusting the at least one transmit parameter comprises adjusting a frequency.

6. The method of claim 1, wherein the adjusting the at least one transmit parameter comprises adjusting a timing.

7. The method of claim 1, wherein the monitoring comprises tracking Doppler frequency at the terminal.

8. The method of claim 7, wherein the tracking Doppler frequency comprises using position location information received from a Global Positioning System.

9. The method of claim 1, further comprising basing the orthogonal multiple access communication on Orthogonal Code Division Multiple Access.

10. The method of claim 1, further comprising basing the orthogonal multiple access communication on Orthogonal Frequency Division Multiple Access.

11. Apparatus for use in a terminal for providing orthogonal multiple access communication in a return link in a satellite communication system, the apparatus comprising:
- a processor configured to perform a closed loop control of at least one transmit parameter associated with transmission of signals, closed loop control effected via a control signal received by the terminal, the control signal comprising instructions used by the terminal to adjust the at least one transmit parameter; and
- a motion detecting unit coupled to the processor configured to detect changes in motion of the terminal;
- wherein the processor is further configured to perform an open loop control of the at least one transmit parameter in response to a change detected by the motion detecting unit that meets a threshold indicative of an abrupt change in motion, the open loop control comprising at least discontinuing adjustment of the at least one transmit parameter using the instructions received via the control signal.

12. The apparatus of claim 11, wherein the control signal is a forward link pilot signal.

13. The apparatus of claim 12, wherein the processor is further configured to send a reverse link pilot signal for use in generating the control signal.

14. The apparatus of claim 11, wherein the processor is further configured to perform the open loop control by adjusting the at least one transmit parameter based on the change detected by the motion detecting unit independently of the control signal.

15. The apparatus of claim 11, wherein the at least one transmit parameter is frequency.

16. The apparatus of claim 11, wherein the at least one transmit parameter is timing.

17. The apparatus of claim 11, wherein the motion detecting unit comprises a Global Positioning System (GPS) receiver configured to generate position location information used for monitoring to detect the changes in the motion of the terminal.

18. The apparatus of claim 17, wherein the position location information is used to track Doppler frequency.

19. The apparatus of claim 11, wherein the orthogonal multiple access communication is based on Orthogonal Code Division Multiple Access.

20. The apparatus of claim 11, wherein the orthogonal multiple access communication is based on Orthogonal Frequency Division Multiple Access.

21. Apparatus for providing orthogonal multiple access communication in a return link of a satellite communication system, comprising:
- means for receiving a control signal comprising instructions used to adjust at least one transmit parameter associated with transmission of signals;
- means for performing a closed loop control of the at least one transmit parameter by adjusting the at least one transmit parameter in accordance with the instructions;
- means for monitoring to detect a change in motion of a terminal; and
- means for performing an open loop control of the at least one transmit parameter if the change meets a threshold indicative of an abrupt change in motion, the open loop control comprising at least discontinuing adjustment of the at least one transmit parameter using the instructions.

22. A non-transitory machine-readable storage medium having stored thereon computer-executable instructions that, when executed on one or more processors, facilitate orthogonal multiple access communication in a return link of a satellite communication system, instructions comprising:
- instructions for performing a closed loop control of at least one transmit parameter associated with transmission of signals, the closed loop control is effected via a control signal received at a terminal, the control signal comprising instructions used by the terminal to adjust the at least one transmit parameter;
- instructions for monitoring to detect changes in motion of the terminal; and
- instructions for performing an open loop control of the at least one transmit parameter if the monitoring detects a change that meets a threshold indicative of an abrupt change in motion, the open loop control comprising at least discontinuing adjustment of the at least one transmit parameter using the control signal.

23. A method for providing orthogonal multiple access communication in a return link of a satellite communication system, the method comprising:
- receiving a forward link pilot signal at a terminal;
- deriving a transmit parameter from the forward link pilot signal;
- sending a reverse link pilot signal based on the transmit parameter;
- receiving a control signal containing instructions to adjust the transmit parameter, the instructions based at least in part on a comparison between the reverse link pilot signal and a reverse link reference signal;
- adjusting the transmit parameter in accordance with the instructions;
- monitoring to detect changes in motion of the terminal; and
- adjusting the transmit parameter based on a change in motion detected by the monitoring and independently of the received control signal if the change in motion detected by the monitoring meets a threshold indicative of an abrupt change in motion.

24. The method of claim 23, wherein the deriving the transmit parameter comprises deriving a frequency.

25. The method of claim 23, wherein the deriving the transmit parameter comprises deriving a timing.

26. The method of claim 23, wherein the monitoring comprises using position location information received from a Global Positioning System.

27. The method of claim 23, further comprising basing the orthogonal multiple access communication on Orthogonal Code Division Multiple Access.

28. The method of claim 23, further comprising basing the orthogonal multiple access communication on Orthogonal Frequency Division Multiple Access.

29. The machine-readable storage medium of claim 22, further comprising instructions for sending a reverse link pilot signal for use in generating the control signal.

* * * * *